Figures 1, 2:
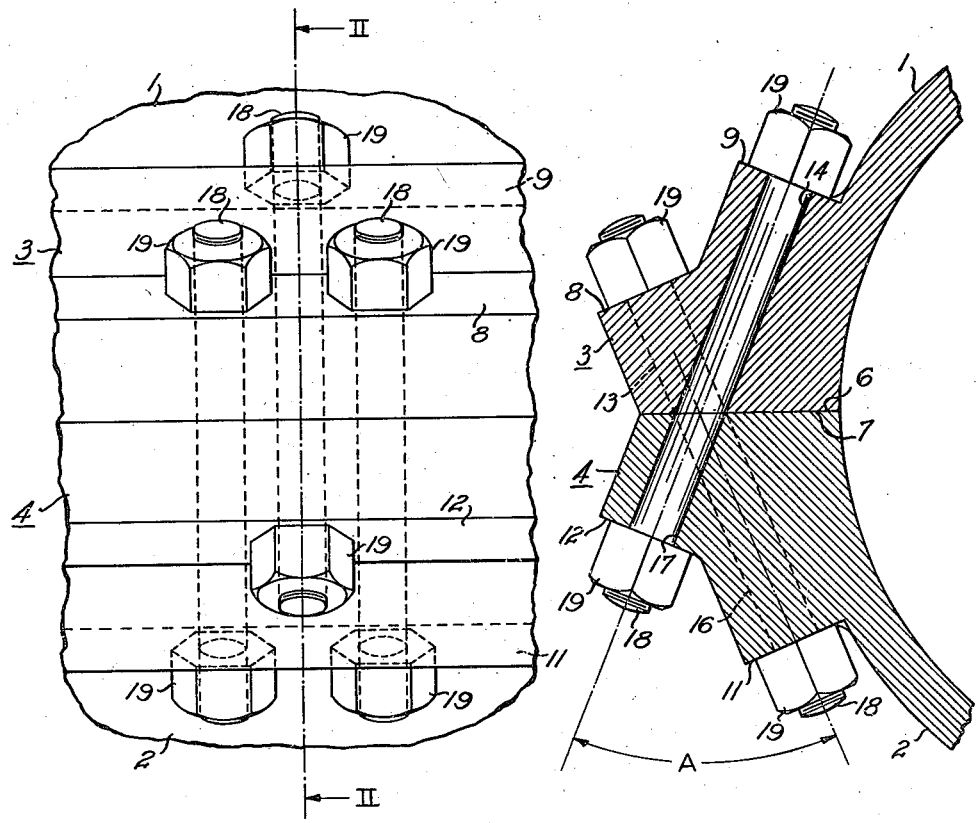

Oct. 26, 1948.  H. P. DAHLSTRAND  2,452,227

FLANGED JOINT

Filed March 8, 1946

INVENTOR
Hans P. Dahlstrand
BY
ATTORNEY

Patented Oct. 26, 1948

2,452,227

UNITED STATES PATENT OFFICE 2,452,227

FLANGED JOINT

Hans P. Dahlstrand, Wauwatosa, Wis., assignor to Allis-Chalmers Manufacturing Company, Milwaukee, Wis., a corporation of Delaware Application March 8, 1946, Serial No. 652,882

7 Claims. (Cl. 189—36)

This invention relates generally to a joint structure for turbine cylinders, vessels, etc. (hereinafter referred to as casings) formed of separable members or parts (hereinafter called sections) having complementary flanged edge portions provided with alined apertures and detachably united by inserting bolts or like securing elements therethrough.

Some casings of the type above mentioned are subjected to conditions, for example large variations in temperature and/or a high internal pressure, necessitating an extremely strong and rigid connection between the flanged edges of the separable casing sections. However, in many instances it is impossible to obtain a desired or requisite degree of securing action through the use of ordinary bolts as the number of such bolts which can be effectively utilized per unit length of joint is necessarily limited by the dimensions of the enlarged portions, such as the bolt heads and/or nuts, at the opposite ends thereof. And although as heretofore proposed more bolts can be effectively utilized by counter-sinking the outer exposed end of alternate ones of the bolt receiving apertures in each flange and by employing bolts each having a special detachable head and locking piece disposed and held within the countersunk end of each such aperture by the nut on the adjacent bolt, such a construction is relatively expensive to manufacture and assemble.

Therefore, the present invention is directed toward and has as an object, the provision of an improved flange-type joint structure for readily detachably uniting the separable sections of a casing in a manner effecting a maximum degree of securing action per unit length of joint with a standard form of bolt.

More particularly the present invention is directed toward and has as a further object the provision of separable casing sections having complementary apertured flanges adapted to be detachably united in abutting relation and each presenting, in addition to its joint forming surface, a pair of oppositely sloping bolt-head or nut engaging surfaces which extend generally longitudinally of the joint and can be readily and cheaply formed with a minimum of skill and which permit arranging the bolt receiving apertures in oppositely inclined, nonintersecting staggered relation with respect to each other with the longitudinal axes of the apertures approximately normal alternately to one and the other of such oppositely sloping surfaces.

The construction and application of apparatus embodying the invention will become readily apparent as the disclosure progresses and particularly points out additional objects and advantages considered of special importance and of general application although shown and described as applied to part of a cylindrical casing structure. And accordingly, the invention may be considered as consisting of separable casing sections or the like embodying a flange construction and/or a flanged joint as hereinafter more fully set forth in the detailed description and appended claims, reference being had to the accompanying drawing illustrating one embodiment of the invention and in which:

Fig. 1 is a side elevation of part of a cylindrical casing structure embodying separable sections constructed and united in accordance with the present invention; and Fig. 2 is a section taken on line II—II of Fig. 1.

In the illustrated embodiment of the invention, the casing comprises complementary sections 1 and 2 having similar longitudinally extending flange portions 3 and 4 presenting joint forming surfaces 6 and 7 disposed in abutting engagement. Flange 3 also presents a pair of oppositely sloping external surfaces 8 and 9 defining oppositely sloping general planes disposed in spaced relation with respect to each other and with respect to its joint forming surface 6. Flange 4 also presents a pair of plain oppositely sloping external surfaces 11 and 12 which are arranged in a similar manner to the like surfaces 8 and 9 on flange 3. And in this connection it will be noted that the pairs of oppositely sloping surfaces extend generally longitudinally of the joint and that the oppositely facing surfaces 8 and 11 are generally parallel with respect to each other as are also the oppositely facing surfaces 9 and 12.

Flange 3 is provided with a plurality of bolt receiving apertures 13 and 14 which extend therethrough in nonintersecting relation from a longitudinal series of spaced points on its joint forming surface 6 alternately to one and the other of its oppositely sloping surfaces 8 and 9, respectively. Flange 4 is provided with a plurality of similarly arranged bolt receiving apertures 16 and 17. And it will be noted that the apertures 13 and 14 in flange 3 are alined with the apertures 16 and 17 in flange 4. In this connection the sloping surfaces 8, 9, 11 and 12 are preferably so arranged relative to the joint forming surfaces 6 and 7 that lines drawn through the flanges so as to lie in a vertical plane and in normal intersecting relation to the longitudinal approximate center lines of opposite pairs of sloping surfaces respectively will intersect the joint forming surfaces at a common point intermediate the inner and outer edges thereof as is indicated by the center lines of apertures 13, 14, 16 and 17 shown in Fig. 2.

When sections 1 and 2 are positioned with the flanges 3 and 4 thereof disposed in the abutting relation shown in Fig. 2, they can be readily detachably secured together simply by inserting similar bolts 18 of standard form through the pairs of alined apertures 13, 16 and 14, 17 and by securing nuts 19 to the opposite ends thereof. In this connection, bolts having an integral head portion on one end thereof may be used if desired as in either case the enlarged bolt heads and/or nuts at the opposite ends of the bolts are readily accessible.

And it should be obvious that a maximum securing action and overall best results are obtained by making the angle A between the center lines of the bolt receiving apertures as small as possible consistent with a minimum distance between bolts and with a flange portion of practical dimensions for the service intended. However, if the casing is to be subjected to large variations in temperature, it is desirable to minimize massiveness of the flange in order to avoid an objectionable degree of casing distortion generally attributable to a differential heating or cooling of the relatively thin and massive portions of the casing sections. And knowing the conditions of temperature and/or pressure to which a casing structure is to be subjected, anyone skilled in the art can readily design a suitable flange portion and/or joint structure of the general character hereinbefore disclosed.

In general, a construction of the character herein disclosed permits separable casing sections to be readily detachably united with a standard form of bolt to effect a maximum degree of securing or clamping action per unit length of joint. And although the invention is shown as applied to a longitudinal joint, it should be understood that its application is in no manner so limited and that it is not intended to be limited to the exact details of construction herein shown and described for purposes of illustration as various modifications within the scope of the appended claims may occur to persons skilled in the art.

It is claimed and desired to secure by Letters Patent:

1. In a casing section having a flange portion adapted to abut and be detachably secured to a like portion of another section by inserting securing elements through alined apertures provided in the flange portions thereof, a flange portion on said section having a joint forming surface and a pair of oppositely sloping surfaces spaced from each other and from said joint forming surface, said flange having a plurality of apertures extending therethrough from said joint forming surface alternately to one and the other of said pair of oppositely sloping surfaces in oppositely inclined, nonintersecting relation with respect to each other, at least the portions of said oppositely sloping surfaces adjacent said apertures presenting generally plane surfaces respectively for engagement by securing element-portions.

2. In a casing section having a flange portion adapted to abut and be detachably secured to a like portion of another section by inserting securing elements through alined apertures provided in the flange portions thereof, a flange portion on said section having a joint forming surface and a pair of oppositely sloping surfaces extending generally longitudinally of said joint forming surface in spaced relation thereto and in spaced relation with respect to each other, said flange having a plurality of apertures extending therethrough from said joint forming surface alternately to one and the other of said pair of oppositely sloping surfaces in oppositely inclined relation with respect to each other, alternate ones of said apertures being in generally parallel relation with respect to each other, at least the portions of said oppositely sloping surfaces adjacent said apertures presenting generally plane surfaces respectively for engagement by securing element-portions.

3. In a casing section having a flange portion adapted to abut and be detachably secured to a like portion of another section by inserting securing elements through alined apertures provided in the flange portions thereof, a flange portion on said section having a joint forming surface and a pair of oppositely sloping surfaces spaced from each other and from said joint forming surface, said flange having a plurality of apertures extending therethrough, in nonintersecting relation from a longitudinal series of spaced points on said joint forming surface alternately to one and the other of said pair of oppositely sloping surfaces in approximately normal relation thereto, at least the portions of said oppositely sloping surfaces adjacent said apertures presenting generally plane surfaces respectively for engagement by securing element-portions.

4. In a casing section having a flange portion adapted to abut and be detachably secured to a like portion of another section by inserting securing elements through alined apertures provided in the flange portions thereof, a flange portion on said section having a joint forming surface and a pair of oppositely sloping surfaces spaced from each other and from said joint forming surface so that lines drawn through the flange in normal relation to said oppositely sloping surfaces will intersect said joint forming surface, said flange having a plurality of apertures extending therethrough from said joint forming surface alternately to one and the other of said pair of oppositely sloping surfaces in oppositely inclined, nonintersecting relation with respect to each other, at least the portions of said oppositely sloping surfaces adjacent said apertures presenting generally plane surfaces respectively for engagement by securing element-portions.

5. A joint structure comprising a pair of casing sections having complementary flanged portions disposed in abutting engagement and each presenting a joint forming surface and a pair of oppositely sloping external surfaces spaced from each other and from said joint forming surface with each of the oppositely sloping surfaces on one flange portion disposed in generally parallel relation with respect to a similarly sloping surface on the other flange portion, said flange portions each having a plurality of apertures extending therethrough from its said joint forming surface alternately to one and the other of its said oppositely sloping surfaces with the apertures in one flange portion alined with the apertures in the other flange portion, at least the portions of said oppositely sloping surfaces adjacent said apertures presenting generally plane surfaces respectively for engagement by enlarged portions of bolts, and a bolt extending through each pair of alined apertures and having at its opposite ends enlarged portions of standard form engaging a pair of the oppositely facing and similarly sloping parallel surfaces presented by said flange portions.

6. A joint structure comprising a pair of casing sections having complementary flanged portions disposed in abutting engagement and each presenting a joint forming surface and a pair of oppositely sloping external surfaces which are spaced from each other and which extend generally longitudinally of the joint in spaced relation with respect to said joint forming surface with each of the oppositely sloping surfaces in one flange portion disposed in generally parallel relation with respect to a similarly sloping surface on the other flange portion, said flange portions each having a plurality of apertures extending therethrough from a longitudinal series of spaced points on its said joint forming surface alternately to one and the other of its said oppositely sloping surfaces with the apertures in one flange portion alined with the apertures in the other flange portion at least the portions of said oppositely sloping surfaces adjacent said apertures presenting generally plane surfaces respectively for engagement by enlarged portions of bolts, and a bolt extending through each pair of alined apertures and having at its opposite ends enlarged portions of standard form engaging a pair of the oppositely facing and similarly sloping parallel surfaces presented by said flange portions.

7. A joint structure comprising a pair of casing sections having complementary flanged portions disposed in abutting engagement and each presenting a joint forming surface and a pair of oppositely sloping external surfaces which are spaced from each other and which extend generally longitudinally of the joint in spaced relation with respect to said joint forming surface with each of the oppositely sloping surfaces on one flange portion disposed in generally parallel relation with respect to a similarly sloping surface on the other flange portion, said flange portions each having a plurality of apertures extending therethrough in nonintersecting relation from a longitudinal series of spaced points on its said joint forming surface alternately to one and the other of its said oppositely sloping surfaces in normal relation thereto with the apertures in one flange portion alined with the apertures in the other flange portion at least the portions of said oppositely sloping surfaces adjacent said apertures presenting generally plane surfaces respectively for engagement by enlarged portions of bolts, and a bolt extending through each pair of alined apertures and having at its opposite ends enlarged portions of standard form engaging a pair of the oppositely facing and similarly sloping parallel surfaces presented by said flange portions.

HANS P. DAHLSTRAND.

No references cited.